US009644669B2

(12) United States Patent
Griffiths et al.

(10) Patent No.: US 9,644,669 B2
(45) Date of Patent: May 9, 2017

(54) VEHICLE AND A COMPRESSION LOAD LIMITER ASSEMBLY FOR THE VEHICLE

(71) Applicant: GM GLOBAL TECHNOLOGY OPERATIONS LLC, Detroit, MI (US)

(72) Inventors: Leonard Barry Griffiths, Fenton, MI (US); David R. Staley, Flushing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 449 days.

(21) Appl. No.: 13/777,242

(22) Filed: Feb. 26, 2013

(65) Prior Publication Data
US 2014/0238334 A1  Aug. 28, 2014

(51) Int. Cl.
| F16B 43/00 | (2006.01) |
| F16B 13/04 | (2006.01) |
| F16B 19/02 | (2006.01) |
| F16B 5/02  | (2006.01) |

(52) U.S. Cl.
CPC .............. *F16B 43/00* (2013.01); *F16B 13/04* (2013.01); *F16B 19/02* (2013.01); *F16B 5/02* (2013.01)

(58) Field of Classification Search
CPC ........ F16B 43/00; F16B 43/001; F16B 13/04; F16B 13/045; F16B 13/06; F16B 13/12; F16B 13/124; F16B 19/02
See application file for complete search history.

(56) References Cited

U.S. PATENT DOCUMENTS

| 6,430,894 | B1  | 8/2002  | Chae et al. |
| 2005/0117997 | A1* | 6/2005  | Pinzl ............................. 411/367 |
| 2008/0036157 | A1* | 2/2008  | Starr ............................. 277/591 |
| 2011/0064539 | A1* | 3/2011  | Ghatikar et al. ........... 411/371.2 |
| 2012/0247420 | A1  | 10/2012 | Griffiths et al. |

FOREIGN PATENT DOCUMENTS

DE           19653226 A1    7/1997

* cited by examiner

*Primary Examiner* — Jacob Amick
(74) *Attorney, Agent, or Firm* — Quinn Law Group, PLLC

(57) ABSTRACT

A vehicle and a compression load limiter assembly for the vehicle are disclosed. The assembly includes a first component defining a first hole along a first axis to present a first wall radially spaced from the first axis. The assembly also includes a second component defining a second hole along a second axis to present a second wall radially spaced from the second axis. The first and second holes generally align with each other to couple together the first and second components. The assembly further includes a load limiter member including a first body portion engaging one of the first and second walls when disposed in one of the first and second holes. The first body portion has a radially compliant feature to allow movement of the load limiter member within one of the first and second holes in response to a force being applied to the load limiter member.

19 Claims, 3 Drawing Sheets

VEHICLE AND A COMPRESSION LOAD LIMITER ASSEMBLY FOR THE VEHICLE

TECHNICAL FIELD

The present disclosure relates to a vehicle and a compression load limiter assembly for the vehicle.

BACKGROUND

Generally, a vehicle has an engine block and an oil pan attached to a bottom side of the engine block which contains lubricate such as oil to lubricate various moving parts. Sealant can be utilized to seal the oil pan to the engine block to prevent fluid loss therebetween.

SUMMARY

The present disclosure provides a compression load limiter assembly for a vehicle. The assembly includes a first component defining a first hole along a first axis to present a first wall radially spaced from the first axis. The assembly also includes a second component defining a second hole along a second axis to present a second wall radially spaced from the second axis. The first and second holes generally align with each other to couple together the first and second components. The assembly further includes a load limiter member including a first body portion engaging one of the first and second walls when disposed in one of the first and second holes, with the first body portion having a radially compliant feature to allow movement of the load limiter member within one of the first and second holes in response to a force being applied to the load limiter member.

The present disclosure also provides a vehicle including an engine block and an oil pan. The engine block defines a first hole along a first axis to present a first wall radially spaced from the first axis. The oil pan includes a flange defining a second hole along a second axis to present a second wall radially spaced from the second axis. The first and second holes are generally aligning with each other to couple together the engine block and the oil pan. The vehicle further includes a load limiter member. The load limiter member includes a first body portion formed of an elastomer material and a second body portion formed of a metal material. The second body portion has an outer periphery and the first body portion surrounds the outer periphery. The first body portion includes an outer surface engaging one of the first and second walls when disposed in one of the first and second holes. The outer surface has a radially compliant feature to allow movement of the load limiter member within one of the first and second holes in response to a force being applied to the load limiter member.

Generally, the radially compliant feature reduces radial stiffness of the load limiter member to compensate for tolerance differences between the first and second components. The radially compliant feature allows the load limiter member to shift laterally or tilt within one of the first and second holes to reduce distortion of, for example, the oil pan during assembly. Furthermore, the radially compliant feature allows the load limiter member to shift laterally or tilt due to thermal expansion and contraction of the first and second components during or after operation of the vehicle.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
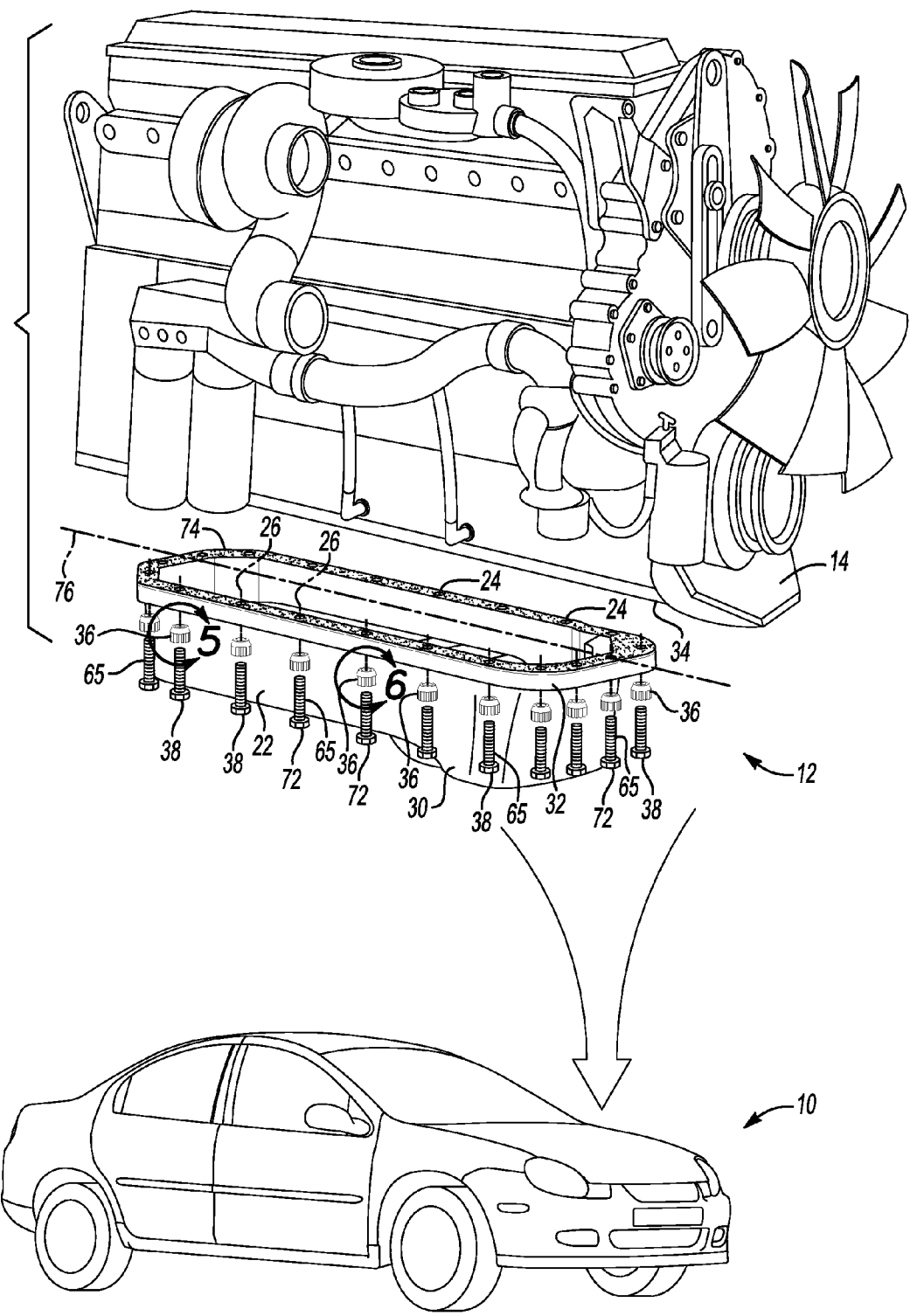
FIG. 1 is a schematic exploded perspective view of a vehicle and a compression load limiter assembly illustrating two different embodiments of load limiter members.

Referring to the Figures, wherein like numerals indicate like or corresponding parts throughout the several views, a vehicle 10 and a compression load limiter assembly 12 for the vehicle 10 are generally shown in FIG. 1. As such, the assembly 12 can be useful for vehicles 10, such as automotive vehicles, etc. It is to be appreciated that the assembly 12 can also be useful for non-automotive applications including, for example, farm, marine, aviation applications, etc.

Figure 2:
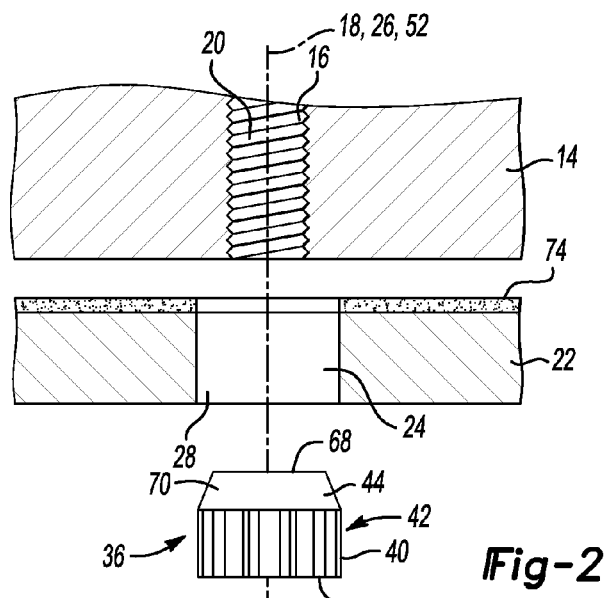
FIG. 2 is a schematic exploded cross-sectional view of a first component, a second component, a load limiter member and a fastener.

Referring to FIGS. 1 and 2, the assembly 12 includes a first component 14 defining a first hole 16 along a first axis 18 to present a first wall 20 radially spaced from the first axis 18. The assembly 12 also includes a second component 22 defining a second hole 24 along a second axis 26 to present a second wall 28 radially spaced from the second axis 26. The first and second holes 16, 24 generally align with each other to couple together the first and second components 14, 22, which is discussed in detail further below. Generally aligning of the first and second holes 16, 24 can include the first and second axes 18, 26 being offset with the holes 16, 24 overlapping (see FIG. 3) or can include the first and second axes 18, 26 being concentric with the holes 16, 24 overlapping (see FIG. 4).

Continuing with FIGS. 1 and 2, the second component 22 can include a main body 30 and a flange 32 extending outwardly from the main body 30. In certain embodiments, the flange 32 can be coupled to the first component 14, with the second hole 24 defined through the flange 32. Therefore, the second component 22 can be attached to the first component 14 by the flange 32. Generally, the second component 22 can be attached to a bottom 34 of the first component 14. It is to be appreciated that the first and second components 14, 22 can be attached to each other in any suitable location. In addition, the second component 22 can be attached to the first component 14 by features other than the flange 32.

In certain embodiments, such as in the automotive application, as shown in FIG. 1, the first component 14 can be defined as an engine block and the second component 22 can be defined as an oil pan. Therefore, for example, the vehicle 10 can include the engine block and the oil pan. The engine block can define the first hole 16 along the first axis 18 to present the first wall 20 radially spaced from the first axis 18. Additionally, the oil pan can include the flange 32 defining the second hole 24 along the second axis 26 to present the second wall 28 radially spaced from the second axis 26. As such, the first and second holes 16, 24 generally align with each other to couple together the engine block and the oil pan. It is to be appreciated that the first component 14 can also be defined as an engine block cover.

The oil pan can contain a lubricant, such as oil, to lubricate various moving parts inside the engine block. The oil pan can have the main body 30 defining a cavity for receiving the lubricant. It is to be appreciated that the second component 22 can be configurations other than the oil pan. Furthermore, it is to be appreciated that the first component 14 can be configurations other than the engine block and the engine block cover.

The first component 14, and thus the engine block, can be formed of a metal material. The metal material of the first component 14 can be aluminum, iron, steel or any other suitable metal material. Furthermore, the second component 22, and thus the oil pan, can be formed of a composite material. The composite material can be a glass-reinforced polyamide, a glass-reinforced nylon or any other suitable composite material. Generally, the metal material and the composite material can have a coefficient of thermal expansion different from each other. Simply stated, the first and second components 14, 22 can have different coefficients of thermal expansion.

Referring to FIGS. 1-4, the vehicle 10 and the assembly 12 further include a load limiter member 36. Generally, the load limiter member 36 prevents excessive compression of the second component 22 by a fastener 38 when the fastener 38 couples the first and second components 14, 22 together. More specifically, for example, the load limiter member 36 prevents excessive compression of the flange 32 of the second component 22 by the fastener 38 when the fastener 38 couples the first and second components 14, 22 together. The function of the load limiter member 36 is discussed in detail further below.

As best shown in FIGS. 2 and 5-7, the load limiter member 36 includes a first body portion 40 engaging one of the first and second walls 20, 28 when disposed in one of the first and second holes 16, 24. In one embodiment, the first body portion 40 is disposed in the second hole 24 to engage the second wall 28. Therefore, during assembly of the load limiter member 36 to the second component 22, the load limiter member 36 is inserted into the second hole 24 to present an interference fit with the second wall 28. In other words, the first body portion 40 engages the second wall 28 to maintain the load limiter member 36 in the second hole 24. As such, the interference fit creates a force 41 (see FIG. 4), such as a compression force, applied to the first body portion 40 by the second wall 28. It is to be appreciated that the load limiter member 36 can present a friction fit, a press fit, etc. with the second wall 28 to maintain the load limiter member 36 in the second hole 24. Generally, the interference fit between the load limiter member 36 and the second wall 28 is to lightly hold the load limiter member 36 in place within the second hole 24, which is discussed further below. Optionally, the load limiter member 36 can be secured in the second hole 24 with a mechanical locking feature.

Generally, the first body portion 40 can be formed of an elastomer material. The first body portion 40 is formed of the elastomer material to allow radial compliance of the first body portion 40. In other words, the first body portion 40 reduces radial stiffness of the load limiter member 36 to allow lateral or tilting movement of the load limiter member 36 in one of the first and second holes 16, 24. For example, the first body portion 40 is elastically deformable to compensate for tolerance differences, such as manufacturing tolerances of the first and second components 14, 22 or manufacturing tolerances between the first and second holes 16, 24. The first body portion 40 can be compressed, flexed, etc. in response to a force 41 (see FIGS. 3 and 4) acting on the first body portion 40, such as the compression force as discussed above. The first body portion 40 can bias or spring back to its original configuration when the force 41 is removed. In certain embodiments, the elastomer material of the first body portion 40 is rubber. It is to be appreciated that the first body portion 40 can be formed of any suitable elastomer material or any other compliant material elastomeric in nature.

Figure 3:
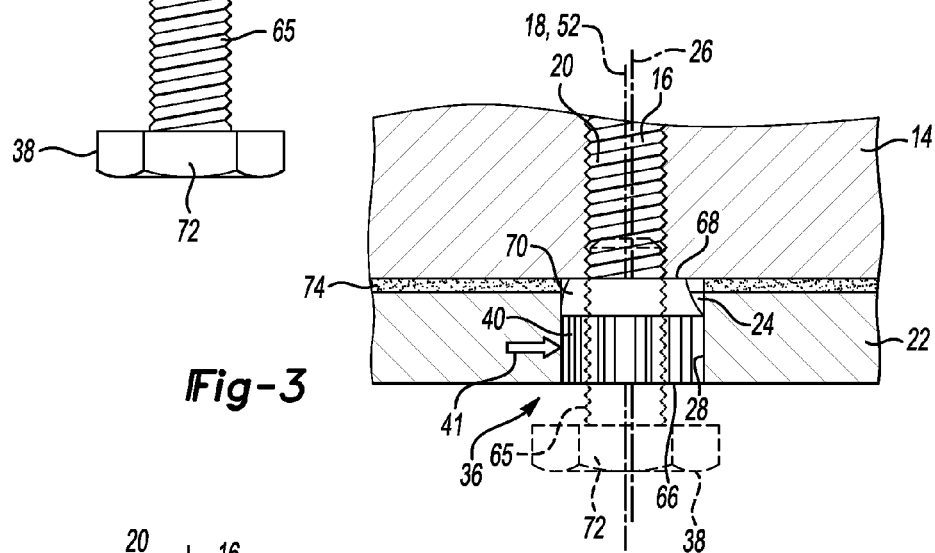
FIG. 3 is a schematic cross-sectional view of the first and second components, with the fastener in phantom lines being inserted through a first hole of the first component and a second hole of the second component, with the first and second holes generally aligning with each other.
Figure 4:
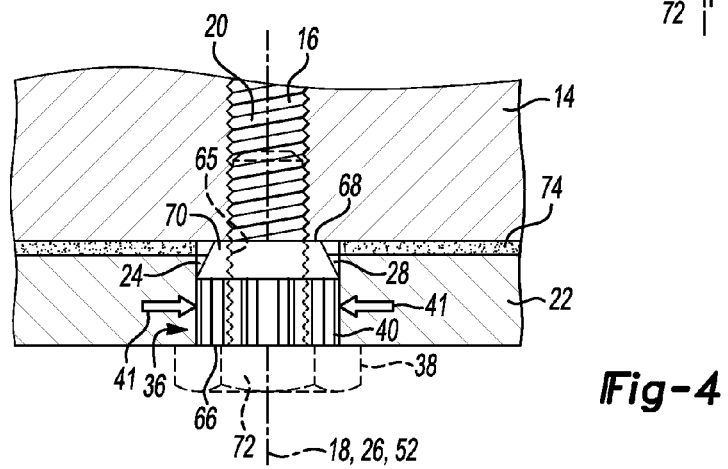
FIG. 4 is a schematic cross-sectional view of the first and second components attached to each other, with the fastener in phantom lines, and the first and second holes generally aligning with each other.
Figure 5:
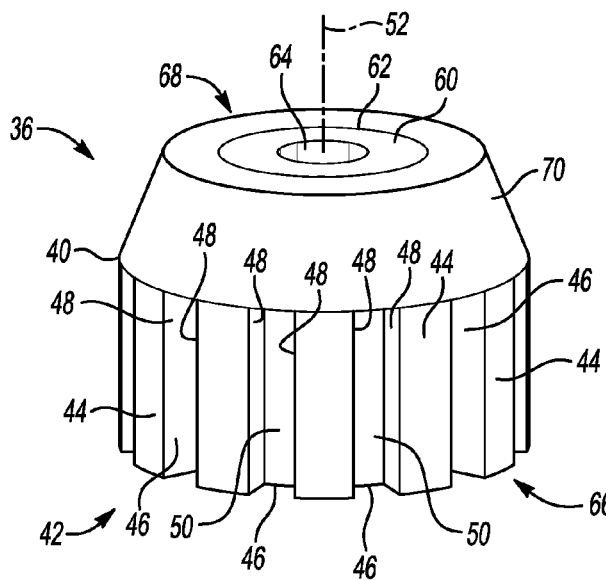
FIG. 5 is a schematic enlarged perspective view of the load limiter member of one embodiment taken from FIG. 1.
Figure 6:
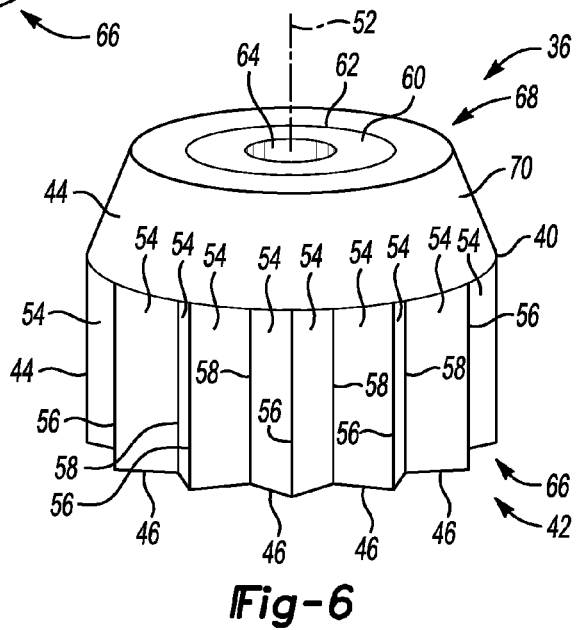
FIG. 6 is a schematic enlarged perspective view of the load limiter member of another embodiment taken from FIG. 1.
Figure 7:
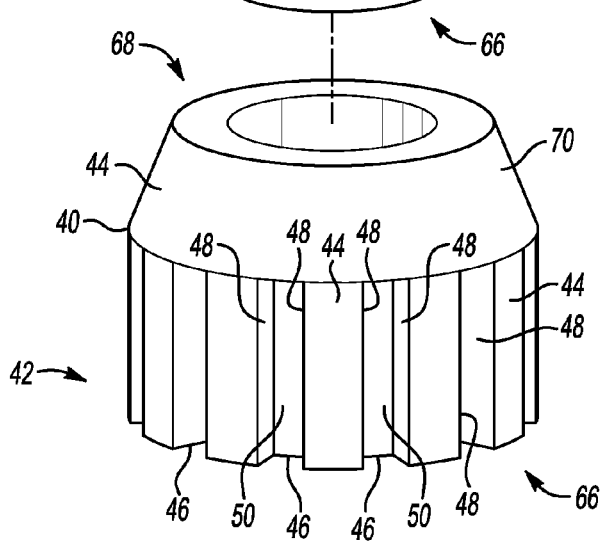
FIG. 7 is a schematic exploded view of the load limiter member of FIG. 5.

As best shown in FIGS. 5-7, the first body portion 40 has a radially compliant feature 42 to allow movement of the load limiter member 36 within one of the first and second holes 16, 24 in response to a force 41 (see FIGS. 3 and 4) being applied to the load limiter member 36. Generally, the force 41 can be applied to the load limiter member 36 while the load limiter member 36 is in one of the first and second holes 16, 24 as shown in FIGS. 3 and 4. As such, generally, the force 41 being applied to the load limiter member 36 is transverse to one of the first and second axes 18, 26. For example, the radially compliant feature 42 reduces radial stiffness of the load limiter member 36 to compensate for tolerance differences, and thus the load limiter member 36 can shift laterally or tilt. Specifically, the radially compliant feature 42 is formed of the elastomer material, as discussed above, to compensate for tolerance differences, such as manufacturing tolerances of the first and second components 14, 22 or manufacturing tolerances between the first and second holes 16, 24. As another example, the radially compliant feature 42 allows the load limiter member 36 to shift laterally or tilt due to thermal expansion and contraction of the first and second components 14, 22 during or after operation of the vehicle 10. Therefore, if the coefficient of thermal expansion is different between the first and second components 14, 22, the load limiter member 36 is designed to move to compensate for these thermal differences. As such, the force 41 being applied to the load limiter member 36 can be from one of the walls 20, 28 as the load limiter member 36 shifts or tilts therein. Furthermore, the radially compliant feature 42 allows for the light interference fit between the load limiter member 36 and, for example, the second wall 28 within the second hole 24. For example, the light interference fit prevents disruptions to the flange 32 or the second wall 28. Simply stated, the light interference fit reduces stress on the flange 32 as compared to a bolt limiter of the prior art that does not have any radially compliant feature 42.

Turning to FIGS. 2, 5 and 6, the first body portion 40 can include an outer surface 44. Generally, the outer surface 44 faces away from the second axis 26. Therefore, the outer surface 44 can engage one of the first and second walls 20, 28 when disposed in one of the first and second holes 16, 24. For example, in one embodiment, the load limiter member 36 is disposed in the second hole 24 and the outer surface 44 engages the second wall 28. Specifically, the outer surface 44 can have the radially compliant feature 42 to allow movement of the load limiter member 36 within one of the first and second holes 16, 24 in response to the force 41 being applied to the load limiter member 36.

Continuing with FIGS. 2, 5 and 6, the radially compliant feature 42 can be further defined as a recess 46 disposed in the outer surface 44 to allow radial compliance of the load limiter member 36 within one of the first and second holes 16, 24 in response to the force 41. For example, when the load limiter member 36 is disposed in the second hole 24, the outer surface 44 allows radial compliance within the second hole 24.

In certain embodiments, the recess 46 can be further defined as a plurality of recesses 46 spaced from each other about the outer surface 44 as best shown in FIGS. 5 and 6. The recesses 46 can be any suitable configuration. Therefore, FIGS. 1, 5 and 6 illustrate two different embodiments for the load limiter member 36. Specifically, FIG. 1 illustrates both of the embodiments of the load limiter member 36.

As best shown in FIG. 5, for example, the recesses 46 can be further defined as slots spaced from each other. Each of the slots can include a pair of sides 48 spaced from each other and a base 50 disposed between respective sides 48. In one embodiment, the slots are spaced from each other radially about a central axis 52. More specifically, the base 50 of each of the slots are also spaced from the outer surface 44 transverse to the central axis 52 such that the sides 48 are disposed between the base 50 of each of the slots and the outer surface 44. Simply stated, the base 50 of the slots are disposed closer to the central axis 52 than the outer surface 44.

As another example, as best shown in FIG. 6, the recesses 46 can be further defined as serrations. Each of the serrations can include a pair of side walls 54 angled relative to each other such that respective side walls 54 engage each other at the outer surface 44. As such, respective side walls 54 engage each other at the outer surface 44 to define respective distal edges 56. Furthermore, respective side walls 54 engage each other at respective proximal edges 58 spaced from the outer surface 44 transverse to the central axis 52. As such, the distal edges 56 protrude outwardly away from the central axis 52 and the proximal edges 58 recede inwardly toward the central axis 52. Simply stated, the proximal edges 58 are disposed closer to the central axis 52 than the distal edges 56. Generally, the distal edges 56 are spaced from each other radially about the central axis 52 and similarly, the proximal edges 58 are spaced from each other radially about the central axis 52.

As best shown in FIGS. 5-7, the load limiter member 36 can further include a second body portion 60 having an outer periphery 62, with the first body portion 40 surrounding the outer periphery 62. Generally, the outer periphery 62 faces away from the central axis 52. Simply stated, the first body portion 40 overlaps or covers the second body portion 60. It is to be appreciated that the first body portion 40 can be molded to the second body portion 60. For example, the first body portion 40 can be over-molded to the second body portion 60. It is to be appreciated that the first body portion 40 can be attached to the second body portion 60 by any suitable method.

Furthermore, the second body portion 60 can define a bore 64 along the central axis 52. Therefore, the fastener 38 can be disposed through the bore 64 and the second hole 24 into the first hole 16 to secure together the first and second components 14, 22. In other words, the fastener 38 is disposed through the bore 64 of the load limiter member 36, through the second hole 24 of the second component 22, and into the first hole 16 of the first component 14. The bore 64 defines a diameter complementary to a diameter of a threaded portion 65 of the fastener 38 to minimize play between the second body portion 60 and the fastener 38. Therefore, shifting or tilting of the fastener 38 correspondingly shifts or tilts the second body portion 60, which correspondingly causes movement of the first body portion 40 and the radially compliant feature 42. Furthermore, the first hole 16 is threaded and defines a diameter complementary to the diameter of the threaded portion 65 of the fastener 38 to secure the fastener 38 to the first component 14.

Generally, the second body portion 60 can be formed of a metal material. The second body portion 60 is formed of the metal material to prevent excessive compression of the second component 22 by the fastener 38 when the fastener 38 couples the first and second components 14, 22 together. More specifically, for example, the second body portion 60 is formed of the metal material to prevent excessive compression of the flange 32 of the second component 22 by the fastener 38 when the fastener 38 couples the first and second components 14, 22 together. In certain embodiments, the metal material of the second body portion 60 is steel. It is to be appreciated that the second body portion 60 can be formed of any suitable metal material.

Referring to FIGS. 5 and 6, the load limiter member 36 can further include a first end 66 and a second end 68 spaced from each other along the central axis 52. More specifically, the second body portion 60 can include the first and second ends 66, 68. Generally, the bore 64 can be disposed through the first and second ends 66, 68 of the load limiter member 36.

In certain embodiments, at least one of the first and second body portions 40, 60 can include a tapered portion 70 tapering toward the central axis 52 adjacent to the second end 68 for guiding the load limiter member 36 into one of the first and second holes 16, 24. In other words, the tapered portion 70 assists in inserting the load limiter member 36 into one of the first and second holes 16, 24. In one embodiment, the first body portion 40 can include the tapered portion 70 tapering toward the central axis 52 adjacent to the second end 68 for guiding the load limiter member 36 into one of the first and second holes 16, 24. In another embodiment, the second body portion 60 can include the tapered portion 70 tapering toward the central axis 52 adjacent to the second end 68. When the second body portion 60 includes the tapered portion 70, the first body portion 40 does not surround or overlap the tapered portion 70. In yet another embodiment, both the first and second body portions 40, 60 can include the tapered portion 70. It is to be appreciated that the recess 46, and more specifically, the recesses 46 can be disposed along the tapered portion 70. It is to also be appreciated that the recess 46, and more specifically, the recesses 46 can be disposed adjacent to the tapered portion 70 and extending to the first end 66 (see FIGS. 5 and 6). In other words, the recesses 46 can be spaced from the tapered portion 70.

In certain embodiments, the first hole 16 can be further defined as a plurality of first holes 16 spaced from each other to present respective first walls 20 and the second hole 24 can be further defined as a plurality of second holes 24 spaced from each other to present respective second walls 28. Therefore, respective first and second holes 16, 24 generally align with each other. Furthermore, in certain embodiments, the load limiter member 36 can be further defined as a plurality of load limiter members 36. As such, one of the load limiter members 36 is disposed in respective ones of the first holes 16 or respective ones of the second holes 24. In one embodiment, one of the load limiter members 36 is disposed in each of the second holes 24. Each of the load limiter members 36 can include the features discussed above for the two embodiments of the single load limiter member 36, and therefore, the details will not be re-discussed. It is to be appreciated that both of the embodiments of the load limiter members 36 (as discussed above) can be utilized at the same time as shown in FIG. 1 or one embodiment of the load limiter members 36 can be utilized at a time, i.e. independently of each other.

The fastener 38 can be further defined as a plurality of fasteners 38 (see FIG. 1), with one of the fasteners 38 disposed through each of the load limiter members 36 and respective second holes 24 into respective first holes 16 to secure together the first and second components 14, 22. In one embodiment, such as in the automotive application, the fasteners 38 secure together the engine block and the oil pan. The radially compliant feature 42 of each of the load limiter members 36 allow self-alignment of the load limiter members 36 as the fasteners 38 draw the second component 22 into engagement with the first component 14 to compensate for tolerances between respective first and second holes 16, 24. More specifically, the radially compliant feature 42 of each of the load limiter members 36 allow self-alignment of the load limiter members 36 as the fasteners 38 draw the oil pan into engagement with the engine block to compensate for tolerances between respective first and second holes 16, 24. Therefore, self-alignment of the load limiter members 36 correspondingly allows self-alignment of the second component 22 relative to the first component 14 as the fasteners 38 secure the components 14, 22 together. Furthermore, the radially compliant feature 42 of each of the load limiter members 36 allow the load limiter members 36 to shift laterally or tilt relative to respective second axes 26 due to thermal expansion and contraction of the first and second components 14, 22 during or after operation of the vehicle 10.

The fasteners 38 can be further defined as bolts or any other suitable fasteners. For example, referring to FIGS. 2-4, each of the bolts are threaded into respective first holes 16 such that a head 72 of each of the bolts abut or rest against respective load limiter members 36. Furthermore, the head 72 of the bolts abut or rest against a portion of the second component 22 to secure the first and second components 14, 22 together. In certain embodiments, the head 72 of the bolts rest against the flange 32 of the second component 22. When resting the head 72 of the bolts against respective load limiter members 36, the bolts cannot compress the flange 32 of the oil pan to a height less than a height of respective load limiter members 36. Specifically, the second end 68 of each of the load limiter members 36 abut, engage or rest against the first component 14 and the head 72 of the bolts can engage the first end 66 of respective load limiter members 36 as shown in FIGS. 2-4. Therefore, the load limiter members 36 prevent excessive compression of the second component 22, such as the flange 32 of the second component 22.

Turning to FIGS. 1-4, furthermore, the assembly 12 can include a sealant 74 disposed along the flange 32 and facing the first component 14 to seal between the first and second components 14, 22 when secured to each other. More specifically, the vehicle 10 can include the sealant 74 disposed along the flange 32 and facing the engine block to seal between the engine block and the oil pan when secured to each other. In other words, the sealant 74 is sandwiched between the oil pan and the engine block to seal therebetween when the engine block and the oil pan are attached to each other. Simply stated, the sealant 74 seals the joint between the first and second components 14, 22. The sealant 74 can aid in preventing lubricant loss between the joint of the first and second components 14, 22. The radially compliant feature 42 of each of the load limiter members 36 allows self-alignment of the load limiter members 36 as the fasteners 38 draw the second component 22 into engagement with the first component 14 to reduce movement of the flange 32 to maintain the configuration of the sealant 74 between the first and second components 14, 22. More specifically, the radially compliant feature 42 of each of the load limiter members 36 allow self-alignment of the load limiter members 36 as the fasteners 38 draw the oil pan into engagement with the engine block to reduce movement of the flange 32 to maintain the body of the sealant 74 between the engine block and the oil pan.

The sealant 74 can be selected from any suitable sealant, such as, but not limited to room-temperature vulcanized sealants and silicone sealants. As used herein, the terminology "room-temperature vulcanized sealant" refers to a two-component material system, e.g., including a base component and a curing agent reactive with the base component, that is cured at ambient temperature, and generally applied to at least one of the first and second components 14, 22 in fluid form. Such material systems have comparatively short set-up or cure times and generally cure within minutes. A fully cured room-temperature vulcanized sealant can provide a fluid-tight seal between the first and second components 14, 22. A suitable example of the room-temperature vulcanized sealant is room-temperature vulcanized silicone rubber.

The radially compliant feature 42 of each of the load limiter members 36 provides multiple benefits as discussed above and as further detailed below. For example, the radially compliant feature 42 can compensate for tolerance differences, such as manufacturing tolerances of the first and second components 14, 22 or manufacturing tolerances between the first and second holes 16, 24. Therefore, the radially compliant feature 42 allows the load limiter members 36 to shift laterally or tilt within one of the first and second holes 16, 24 to reduce distortion of, for example, the oil pan during assembly. For example, a face of the engine block and/or a surface of the flange 32 facing the face of the engine block can each have slight variations which can cause the oil pan to have a tendency to be distorted about a longitudinal axis 76 (see FIG. 1) during assembly of the engine block and the oil pan. The slight variations of the face and the surface can be, for example, waviness, etc. Distortion, such as twisting or bending, of the oil pan can disrupt the sealant 74. Therefore, the radially compliant feature 42 of the load limiter members 36 is designed to minimize distortion of the second component 22, such as the flange 32, to maintain the configuration of the sealant 74 and prevent the load limiter members 36 from acting as fulcrum or pivot points relative to respective central axes 52. Furthermore, the radially compliant feature 42 of the load limiter members 36 is designed to reduce stress on the second component 22, such as the flange 32, as compared to a bolt limiter of the prior art that does not have any radially compliant feature 42. As such, the load limiter members 36 can shift laterally or tilt relative to respective second axes 26 when in respective second holes 24.

As another example, the radially compliant feature 42 allows self-alignment of the load limiter members 36 as the fasteners 38 draw the oil pan into engagement with the engine block to compensate for tolerances between respective first and second holes 16, 24. Therefore, if respective first and second axes 18, 26 do not concentrically align (see FIG. 3), the radially compliant feature 42 allows respective load limiter members 36 to shift laterally or tilt relative to respective second axes 26 within respective second holes 24 as the respective fasteners 38 are securing the engine block and the oil pan together to reduce distortion, such as twisting or bending, of the oil pan during assembly. As such, shifting or tilting can cause the radially compliant feature 42 to compress due to the second wall 28 applying the force 41 to the first body portion 40, as shown in FIG. 3. Specifically, in FIG. 3, for illustrative purposes only, the force 41 is applied to the radially compliant feature from a left side such that a left portion of the radially compliant feature 42 is compressed. Utilizing the load limiter members 36 (as described above) with the radially compliant feature 42, reduces the tendency of the oil pan to twist or bend relative to the longitudinal axis 76 due to the radially compliant feature 42 allowing radial movement of the load limiter members 36 to compensate for tolerance differences.

As yet another example, the radially compliant feature 42 allows the load limiter members 36 to shift laterally or tilt due to thermal expansion and contraction of the first and second components 14, 22 during or after operation of the vehicle 10. Therefore, if the coefficient of thermal expansion is different between the first and second components 14, 22, such as the engine block and the oil pan, the load limiter members 36 are designed to move to compensate for these thermal differences. Therefore, when the composite oil pan thermally expands and contracts, the load limiter members 36 can shift or tilt relative to respective second axes 26 in response to the expansion or contraction which reduces the force 41 acting on the flange 32 or the second walls 28. Thermal expansion or contract can cause respective first and second axes 18, 26 to be offset from each other, i.e., the first and second axes 18, 26 do not concentrically align (see FIG. 3); as such, the radially compliant feature 42 allows respective load limiter members 36 to shift laterally or tilt within respective second holes 24 to compensate for the thermal changes. It is to be appreciated that the first and second axes 18, 26 of respective first and second holes 16, 24 can concentrically align, and thus, one or more of the load limiter members 36 do not have to shift or tilt as shown in FIG. 4.

While the best modes for carrying out the disclosure have been described in detail, those familiar with the art to which this disclosure relates will recognize various alternative designs and embodiments for practicing the disclosure within the scope of the appended claims.

The invention claimed is:

1. A compression load limiter assembly for a vehicle, the assembly comprising:
a first component defining a first hole along a first axis to present a first wall radially spaced from the first axis;
a second component defining a second hole along a second axis to present a second wall radially spaced from the second axis, with the first and second holes generally aligning with each other to couple together the first and second components; and
a load limiter member including a first body portion engaging one of the first and second walls when disposed in one of the first and second holes, with the first body portion having a radially compliant feature to allow movement of the load limiter member within one of the first and second holes in response to a force being applied to the load limiter member;
wherein the first body portion includes an outer surface, with the radially compliant feature defined as a recess disposed in the outer surface to allow radial compliance of the load limiter member within one of the first and second holes in response to the force;
wherein the load limiter member includes a second body portion having an outer periphery, with the first body portion surrounding the outer periphery, and the second body portion directly abuts one of the first and second components;
wherein the recess is further defined as a plurality of recesses spaced from each other about the outer surface.

2. The assembly as set forth in claim 1 wherein the load limiter member is disposed in the second hole, with the outer surface engaging the second wall.

3. The assembly as set forth in claim 1 wherein the recesses are further defined as slots spaced from each other, with each of the slots including a pair of sides spaced from each other and a base disposed between respective sides.

4. The assembly as set forth in claim 1 wherein the recesses are further defined as serrations, with each of the serrations including a pair of side walls angled relative to each other such that respective side walls engage each other at the outer surface.

5. The assembly as set forth in claim 1 wherein the second body portion defines a bore along a central axis, with the outer periphery facing away from the central axis, and further including a fastener disposed through the bore and the second hole into the first hole to secure together the first and second components.

6. The assembly as set forth in claim 5 wherein the load limiter member includes a first end and a second end spaced from each other along the central axis, and wherein the first body portion includes a tapered portion tapering toward the central axis adjacent to the second end for guiding the load limiter member into one of the first and second holes, with the radially complaint feature spaced from the second end and extending from the first end.

7. The assembly as set forth in claim 1 wherein the second body portion is formed of a metal material.

8. The assembly as set forth in claim 7 wherein the metal material of the second body portion is steel.

9. The assembly as set forth in claim 1 wherein the first body portion is formed of an elastomer material.

10. The assembly as set forth in claim 9 wherein the elastomer material of the first body portion is rubber.

11. The assembly as set forth in claim 1 wherein the second component includes a main body and a flange extending outwardly from the main body, with the flange coupled to the first component, and with the second hole defined through the flange.

12. The assembly as set forth in claim 11 wherein the first hole is further defined as a plurality of first holes spaced from each other to present respective first walls, and wherein the second hole is further defined as a plurality of second holes spaced from each other to present respective second walls, and wherein the load limiter member is further defined as a plurality of load limiter members, with one of the load limiter members disposed in each of the second holes.

13. The assembly as set forth in claim 12 further including a plurality of fasteners, with one of the fasteners disposed through each of the load limiter members and respective second holes into respective first holes to secure together the first and second components, and wherein the radially compliant feature of each of the load limiter members allow self-alignment of the load limiter members as the fasteners draw the second component into engagement with the first component to compensate for tolerances between respective first and second holes.

14. The assembly as set forth in claim 13 further including a sealant disposed along the flange and facing the first component to seal between the first and second components when secured to each other, with the radially compliant feature of each of the load limiter members allowing self-alignment of the load limiter members as the fasteners draw the second component into engagement with the first component to reduce movement of the flange to maintain the sealant between the first and second components.

15. A vehicle comprising:
an engine block defining a first hole along a first axis to present a first wall radially spaced from the first axis;
an oil pan including a flange defining a second hole along a second axis to present a second wall radially spaced from the second axis, with the first and second holes generally aligning with each other to couple together the engine block and the oil pan; and
a load limiter member directly abutting the engine block, and including a first body portion formed of an elastomer material and a second body portion formed of a metal material, with the second body portion having an outer periphery, and with the first body portion surrounding the outer periphery;
wherein the first body portion includes an outer surface engaging one of the first and second walls when disposed in one of the first and second holes, with the outer surface having a radially compliant feature to allow movement of the load limiter member within one of the first and second holes in response to a force being applied to the load limiter member;
wherein the radially compliant feature is defined as a plurality of recesses disposed in the outer surface to allow radial compliance of the load limiter member within one of the first and second holes in response to the force;
wherein the recesses are spaced from each other about the outer surface.

16. The vehicle as set forth in claim 15 wherein the first hole is further defined as a plurality of first holes spaced from each other to present respective first walls, and wherein the second hole is further defined as a plurality of second holes spaced from each other to present respective second walls, and wherein the load limiter member is further defined as a plurality of load limiter members, with one of the load limiter members disposed in each of the second holes, and further including a plurality of fasteners, with one of the fasteners disposed through each of the load limiter members and respective second holes into respective first holes to secure together the engine block and the oil pan, and wherein the radially compliant feature of each of the load limiter members allow self-alignment of the load limiter members as the fasteners draw the oil pan into engagement with the engine block to compensate for tolerances between respective first and second holes.

17. The vehicle as set forth in claim 16 further including a sealant disposed along the flange and facing the engine block to seal between the engine block and the oil pan when secured to each other, with the radially compliant feature of each of the load limiter members allowing self-alignment of the load limiter members as the fasteners draw the oil pan into engagement with the engine block to reduce movement of the flange to maintain the sealant between the engine block and the oil pan.

18. The assembly as set forth in claim 1 wherein the load limiter member includes a first end and a second end spaced from each other along a central axis, and wherein the first body portion includes a tapered portion that is disposed adjacent to the second end and spaced from the first end, and the recess is disposed adjacent to the first end and spaced from the second end.

19. The vehicle as set forth in claim 15 wherein the load limiter member includes a first end and a second end spaced from each other along a central axis, and wherein the first body portion includes a tapered portion that tapers relative to the central axis, and wherein the tapered portion and the recesses are orientated axially relative to each other along the central axis.

* * * * *